United States Patent [19]
Sebens et al.

[11] 4,250,553
[45] Feb. 10, 1981

[54] FLUID FLOW MEASUREMENT SYSTEM

[75] Inventors: Carl R. Sebens, Stratford; Chester G. Fisher, Southport, both of Conn.

[73] Assignee: The Perkin-Elmer Corporation, Norwalk, Conn.

[21] Appl. No.: 17,867

[22] Filed: Mar. 5, 1979

[51] Int. Cl.$^3$ .................. G06F 15/32; G01F 1/36; G01J 3/42; G01N 31/12

[52] U.S. Cl. .................. 364/510; 356/315; 364/573; 364/558; 431/126

[58] Field of Search .......... 364/509, 510, 573, 498, 364/558, 108, 109; 431/79, 126; 356/315; 422/78

[56] References Cited

U.S. PATENT DOCUMENTS

| | | | |
|---|---|---|---|
| 2,847,899 | 8/1958 | Walsh | 356/315 |
| 3,516,771 | 6/1970 | Rendina | 431/126 |
| 3,525,476 | 8/1970 | Boling et al. | 239/338 |
| 3,583,844 | 6/1971 | Smith, Jr. | 356/315 X |
| 3,586,441 | 6/1971 | Smith et al. | 356/315 X |
| 3,689,225 | 9/1972 | White | 356/315 X |
| 3,739,159 | 6/1973 | Nalley | 364/510 |
| 3,752,393 | 8/1973 | Moseley | 364/510 |
| 3,806,250 | 4/1974 | George | 356/315 |
| 3,875,955 | 4/1975 | Gallatin et al. | 364/510 X |
| 4,125,225 | 11/1978 | Venghiattis | 239/338 |

OTHER PUBLICATIONS

Barnett—"Acid Interferences in Atomic Absorption Spectrometry"-*Analytical Chemistry*-vol. 44, No. 4, Apr. 1972, pp. 695-698.

*Primary Examiner*—Joseph F. Ruggiero
*Attorney, Agent, or Firm*—Salvatore A. Giarratana; Francis L. Masselle; Edwin T. Grimes

[57] ABSTRACT

An oxidant flow conduit having a restriction and branching downstream of the restriction to provide a primary flow conduit for supplying oxidant to a nebulizer and an auxiliary flow conduit having an adjustable valve for supplying oxidant to a mixing chamber is provided. A differential pressure transducer measures the pressure drop across the restriction to provide an output signal. A primary fuel conduit is provided having a pair of restrictions with an adjustable valve for supplying fuel to the mixing chamber. A boost conduit having a restriction is connected to the primary fuel conduit and between the restrictions providing for supplementing the fuel to the mixing chamber when a different fuel mixture is used. A differential pressure transducer measures the pressure drop across the pair of restrictions to provide an output signal. A square root linearization operation is performed on each signal in a microprocessor and modified output signals drive respective fuel and oxidant digital displays. Consequently, increased and substantially identical sensitivity to adjustment and attainment of normal flame conditions are achieved when switching between boosted and nonboosted fuel flow.

5 Claims, 5 Drawing Figures

FLUID FLOW MEASUREMENT SYSTEM

BACKGROUND OF THE INVENTION

The present invention relates to a fluid flow measuring and control system for the burner in atomic spectroscopic instrumentation and particularly relates to a fluid flow measuring and control system for accurately reproducing flame conditions in the burner of an atomic absorption instrument.

In the atomizer used in atomic spectroscopy, ground state atoms of the sample are generated and disposed in the optical path of the photometer. The most widely used technique for accomplishing this is to directly aspirate the sample solution into the flame generated by a burner system. The burner system for conventional flame atomization includes a nebulizer through which sample solution is aspirated and sprayed as a fine aerosol into a mixing chamber. Fuel gas is introduced into the mixing chamber through a fuel inlet. Oxidant also enters through an auxiliary port directly into the mixing chamber as well as primarily through an inlet port to the nebulizer. In the mixing chamber, the sample aerosol is mixed with the fuel and oxidant and carried to the burner head. Combustion takes place at the burner head and the sample is vaporized to free ground state atoms for measurement in the optical path of the photometer.

In a conventionally utilized flow control system for the burner, fuel and oxidant flow through separate conduits each containing a flow meter and a flow regulator, for example a needle valve, for adjusting the flow. In the oxidant flow system, an auxiliary conduit branches from the oxidant supply conduit, between the flow meter and the nebulizer, to supply oxidant directly to the mixing chamber. Thus oxidant flow adjustment is made in the auxiliary conduit while oxidant flow to and through the neubilizer remains essentially constant. In this prior system, a floating ball type sensor is utilized as an indication of the flow in each of the fuel and oxidant flow conduits. Thus, the flow is adjustable in each conduit in accordance with the flow indications given by the respective ball sensors. However, the reproducibility of the flow indication by each of these sensors for given flows is not accurate and the ball will frequently spin or hop resulting in only coarse measurements at best. Contamination, for example by dirt or grit in the flow conduits, can also lead to erroneous readings of the flow meters. Consequently, accurate and reproducible flame conditions cannot be set and obtained from day to day or from analysis to analysis.

SUMMARY OF THE PRESENT INVENTION

Accordingly, it is a primary object of the present invention to provide a novel and improved fluid flow measuring and control system for the burner in flame spectroscopic instrumentation.

It is another object of the present invention to provide a novel and improved fluid flow measuring and control system for the burner used in flame spectroscopic instrumentation wherein reproducible flame conditions from analysis to analysis are provided.

It is still another object of the present invention to provide a novel and improved fluid flow measuring and control system for the burner in flame spectroscopic instrumentation wherein uniform and sensitive adjustment of each of the fuel and oxidant flows are obtained throughout substantially the adjustable range of the flows.

It is a further object of the present invention to provide a novel and improved fluid flow measuring and control system for the burner in flame spectroscopic instrumentation wherein the flow sensing signals are linearized by a square root operation for digital display scaled to substantial uniformity throughout the full range of flows of both fuel and oxidant.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects and in accordance with the purpose of the invention, as embodied in broadly described herein, the fluid flow measuring and control system for the burner in atomic spectroscopic instrumentation comprises a fluid flow conduit having an inlet port and an outlet port for transmitting fluid under pressure from the inlet port to the outlet port, a restriction in the fluid flow conduit providing a pressure drop thereacross, a sensor for sensing the pressure drop across the restriction and providing an output signal proportional to the pressure drop, means operable on the signal for providing a substantially linear indication of the pressure drop as a function of the rate of flow of the fluid through the conduit, and means in the flow conduit downstream of the restriction for adjusting the flow through the conduit to a predetermined flow in accordance with the indication.

Preferably, and in accordance with a significant feature of the present invention, the signal operating means performs a square root linearization operation on the pressure signal to provide input signals to a digital display whereby the display is substantially linearized for the full range of flow through the conduit. It will be appreciated that both separate fuel and oxidant flow conduits are provided with each conduit having a restriction, a sensor, a square root linearization operation performed on the output of the sensor, and flow adjusting means for adjusting the flow to a predetermined flow in accordance with a digital display.

Further, it is a significant feature of the present invention that the fuel flow system includes a primary boost fuel conduit containing an adjustable valve and a pair of restrictions and a flow conduit having a restriction, the boost flow conduit communicating with the primary fuel conduit between its pair of restrictions. The restrictions in the fuel conduit are selected to enable the digital display to have corresponding values both when the boost conduit is utilized, for example when a nitrous oxide-acetylene flame is desired or when only the primary fuel conduit is utilized, for example when an air-acetylene flame is desired. This minimizes adjustment of the flow through the conduits when switching from one fuel mixture to the other.

The invention consists in the novel parts, constructions, arrangements, combinations and improvements shown and described. The accompanying drawings which are incorporated in and constitute a part of this specification illustrate one embodiment of the invention and, together with the description, serve to explain the principles of the invention.

Reference will now be made in detail to the present preferred embodiment of the invention, an example of which is illustrated in the accompanying drawings.

Figure 1:
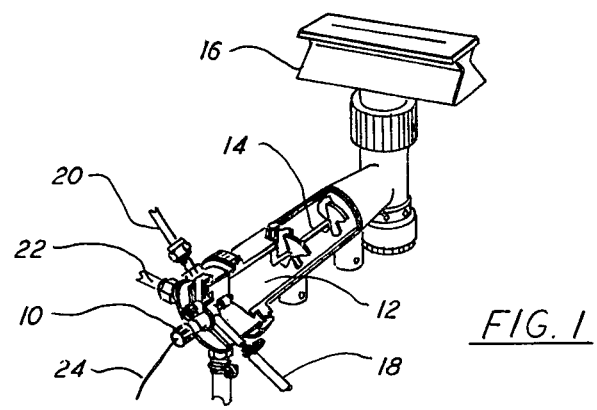
FIG. 1 is a schematic perspective view of a conventional flow system for the burner in atomic spectroscopic instrumentation.

Referring now to FIG. 1, there is illustrated a typical burner system for atomic spectroscopic instrument e.g., an atomic absorption instrument, comprising a nebulizer 10, a mixing chamber 12, a flow spoiler 14 disposed in mixing chamber 12, and a typical burner head 16. Oxidant is supplied to the system primarily through nebulizer 10 by a conduit 18. Oxidant is also supplied to mixing chamber 12 through a conduit 20 in communication with mixing chamber 12 downstream of nebulizer 10 and containing an adjustable valve, not shown, to enable oxidant flow adjustments for burner control while the flow through the nebulizer remains substantially constant. Also illustrated in FIG. 1 is a fuel conduit 22 for admitting fuel to mixing chamber 12 and an inlet conduit 24 for supplying sample solution to nebulizer 10. Consequently, it will be appreciated that sample solution is aspirated through nebulizer 10 and sprayed as an aerosol into mixing chamber 12. In chamber 12, the fuel and oxidant gases are mixed and carried to burner head 16 for combustion and sample atomization.

Figure 2:
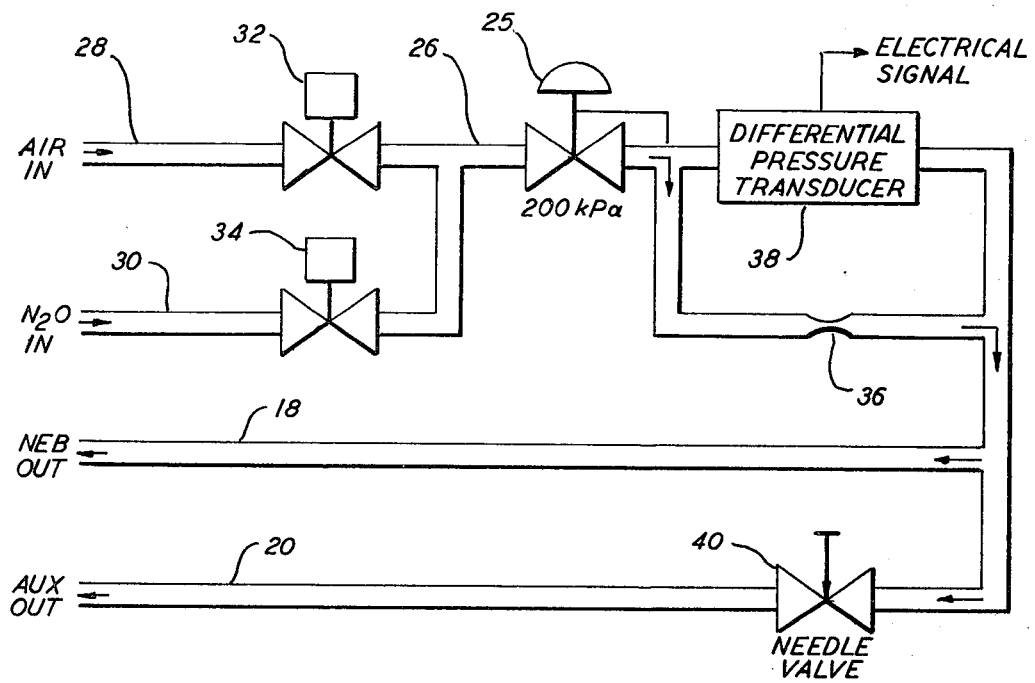
FIG. 2 is a schematic view of a oxidant flow control and measuring system forming part of the present invention and for use in atomic spectroscopic instrumentation.

FIG. 2 schematically illustrates the oxidant flow system which forms part of the measuring and control system of the present invention and which may be utilized with the burner system disclosed in FIG. 1. In the oxidant flow control system illustrated in FIG. 2, a pressure regulator 25 is provided in a main oxidant flow conduit 26. Feeding into oxidant flow conduit 26 are branch conduits 28 and 30 containing solenoid actuated valves 32 and 34 respectively for controlling flow through branch conduits 28 and 30. As illustrated, branch conduit 28 is coupled to a source of air, not shown, under pressure while branch conduit 30 is coupled to a source of nitrous oxide under pressure, also not shown. Thus, by selective opening and closing of valves 32 and 34, either air or nitrous oxide can be supplied to main oxidant flow conduit 26.

Downstream of pressure regulator 25 and in the main flow conduit 26 is a flow restriction 36. A differential pressure transducer 38 is connected across flow restriction 36 and measures the pressure drop of the oxidant flowing through restriction 36. Differential pressure transducer 38 may be of the type manufactured by National Semiconductor and identified as the LX1702DD series. It will be appreciated that transducer 38 provides a voltage output signal proportional to the pressure drop in conduit 26 across restriction 36. Downstream of restriction 36 conduit 26 branches into the nebulizer inlet conduit 18 and the auxiliary inlet conduit 20 disclosed in FIG. 1. A valve 40, preferably a manually operated needle valve, is disposed in auxiliary oxidant conduit 20 whereby the flow through conduit 20 and consequently the flow of oxidant to burner 16 can be manually adjusted.

Figure 3:
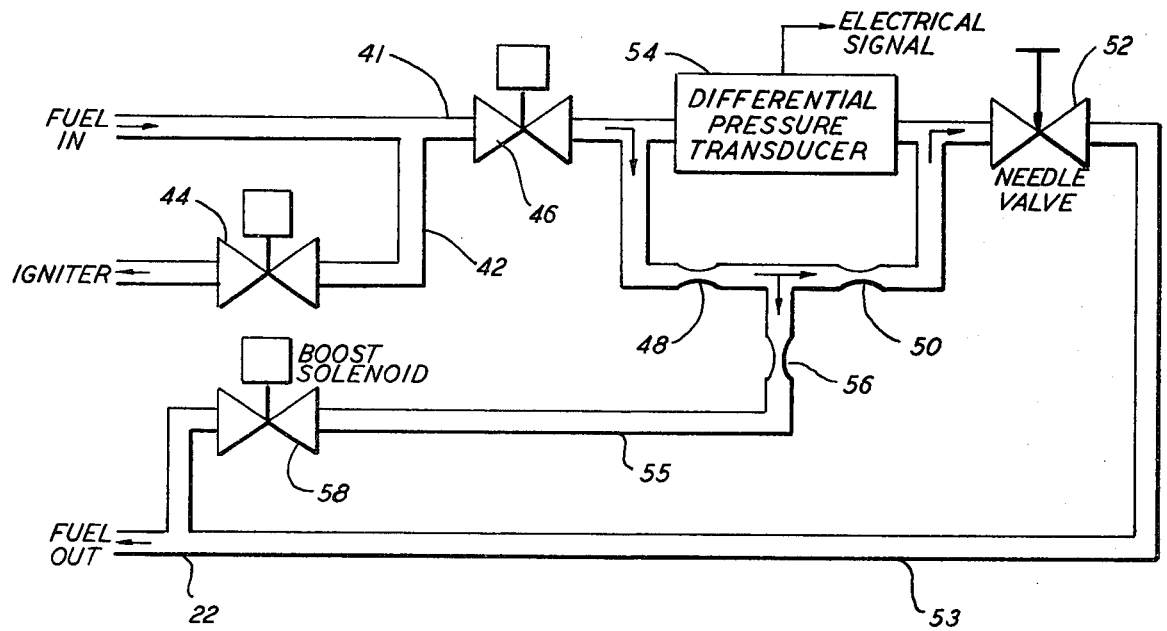
FIG. 3 is a schematic view of an fuel flow control and measuring system forming part of the invention and for use in atomic spectroscopic instrumentation.

Referring now to FIG. 3, the fuel flow system which forms part of the measuring and control system of the present invention and which may be utilized with the burner system disclosed in FIG. 1 is schematically illustrated. The fuel flow system includes a main fuel flow conduit 41 connected to a source of fuel under pressure, not shown, for example acetylene. A branch conduit 42 communicates between main conduit 41 through a valve 44 to an ignitor, not shown, for igniting the flame in burner head 16. A valve 46 is disposed in conduit 41 which is provided with a pair of series connected pressure restrictions 48 and 50. Conduit 41 is also provided with a valve 52, preferably an adjustable needle valve, and further lies in communication with fuel inlet conduit 22 through a conduit portion 53 downstream of valve 52. A differential pressure transducer 54, similar to the differential pressure transducer 38 previously described, is disposed across both restrictions 48 and 50 and between valves 46 and 52 whereby a signal proportional to the total pressure drop across restrictions 48 and 50 is provided.

A boost fuel flow circuit is provided and includes a conduit 55 containing a flow restriction 56 and a solenoid actuated valve 58. The inlet end of conduit 55 is coupled to conduit 41 between restrictions 48 and 50 while its outlet end lies in communication with fuel inlet conduit 22. When an air-acetylene flame is desired, solenoid actuated valves 34 and 58 are closed and valve 32 is opened. Air is thus supplied to nebulizer 10 and mixing chamber 12 through conduit 26, restriction 36 and conduits 18 and 20 and acetylene fuel is supplied mixing chamber 12 solely through conduit 41, restrictions 48,50, conduit portion 53 and fuel inlet 22. Boost conduit 44 is closed by valve 58. When a nitrous oxide acetylene flame is desired, solenoid actuated valves 34 and 50 are opened and valve 32 is closed, nitrous oxide is thus supplied to nebulizer 10 and mixing chamber 12 through conduits 30, 26, restriction 36 and conduits 18 and 20 and acetylene is supplied mixing chamber 12 through conduit 30, restrictions 48,50, conduit portion 53 and fuel inlet 22 as well as through the boost conduit 55 and restriction 56 to fuel inlet 22.

Figure 4:
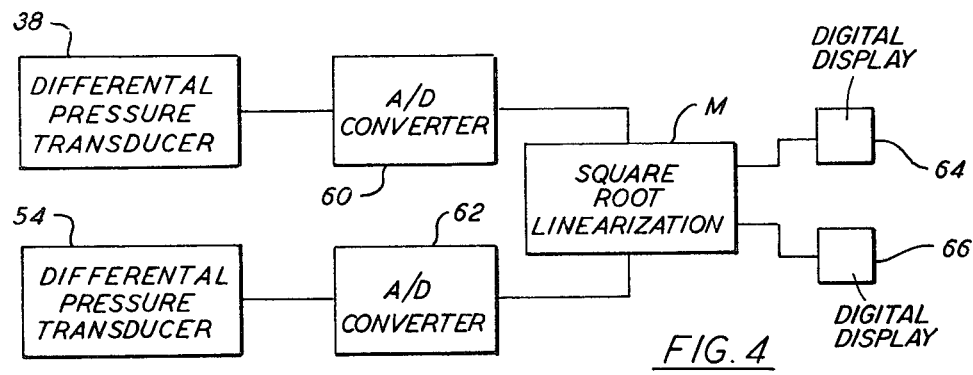
FIG. 4 is a schematic block diagram illustrating the operations performed on the pressure signals generated by the pressure drops in the flow conduits.

FIG. 4, there is illustrated a schematic of the electrical control for the fluid flow measuring and control system hereof. Particularly, each of the differential pressure transducers 38 and 54 respectively provide an output voltage signal responsive to the pressure drop across the respective restrictions to respective A/D converters 60 and 62 for conversion to binary signals. The binary signals are in turn applied as inputs to a microprocessor which performs a square root linearization operation to produce a modified set of output signals. Prior to this operation, microprocessor M also subtracts away electrical offsets present when no gas is flowing from the signal measured when the gas is flowing. The output signals from the microprocessor drive digital displays 64 and 66 to indicate oxidant and fuel flows respectively.

It will be appreciated that adjustment of needle valves 40 and 52 serves to alter the flow through the respective conduits and thus alter the pressure drops across the restrictions measured by the respective transducers. Consequently, the digital displays for each of the oxidant and fuel flows respond to the manual adjustment of the respective oxidant and fuel needle valves 40 and 52. Thus, trimming the flow with the needle valves in their respective conduits to obtain the desired digital settings provides a means for accurately reproducing the burner mixture and consequently the flame conditions from analysis to analysis. The square root linearization of the voltage signals enables substantially uniform settings for the adjustable range of the fuel and oxidant flows.

Referring to the fuel flow system illustrated in FIG. 3, the common restriction 48 is required to provide an indication of total fuel flow. Restriction 56 in boost conduit 55 serves to limit flow of fuel e.g. acetylene, through boost conduit 55. The third restriction 50 in the main fuel conduit 40 increases the sensitivity of the signal from the differential pressure transducer for the adjustable portion of the fuel flow as opposed to the boost portion.

It will be appreciated that restrictions 48 and 50 are selected such that the switch over from an air-acetylene fuel mixture to a nitrous oxide acetylene fuel mixture requiring flow of fuel through the boost conduit 55 can be made while maintaining substantially similar flame conditions between the two mixtures. Consequently, extensive adjustment of the fuel and/or oxidant flows in order to make a change in the flame after switch over from one fuel to the other are not required. In a prefered embodiment of the present invention, restriction 48 has 0.037 inch about 0.094 cm diameter while restriction 50 has a 0.033 inch (about 0.084 cm) diameter. Restriction 56 has a 0.026 inch (about 0.066 cm) diameter. While these sizes are preferred, the benefits and advantages of the present invention are achieved when the first restriction 48 is approximately one quarter to three quarters of the total restriction, e.g. restrictions 48 and 50 combined, through conduit 40.

Figure 5:
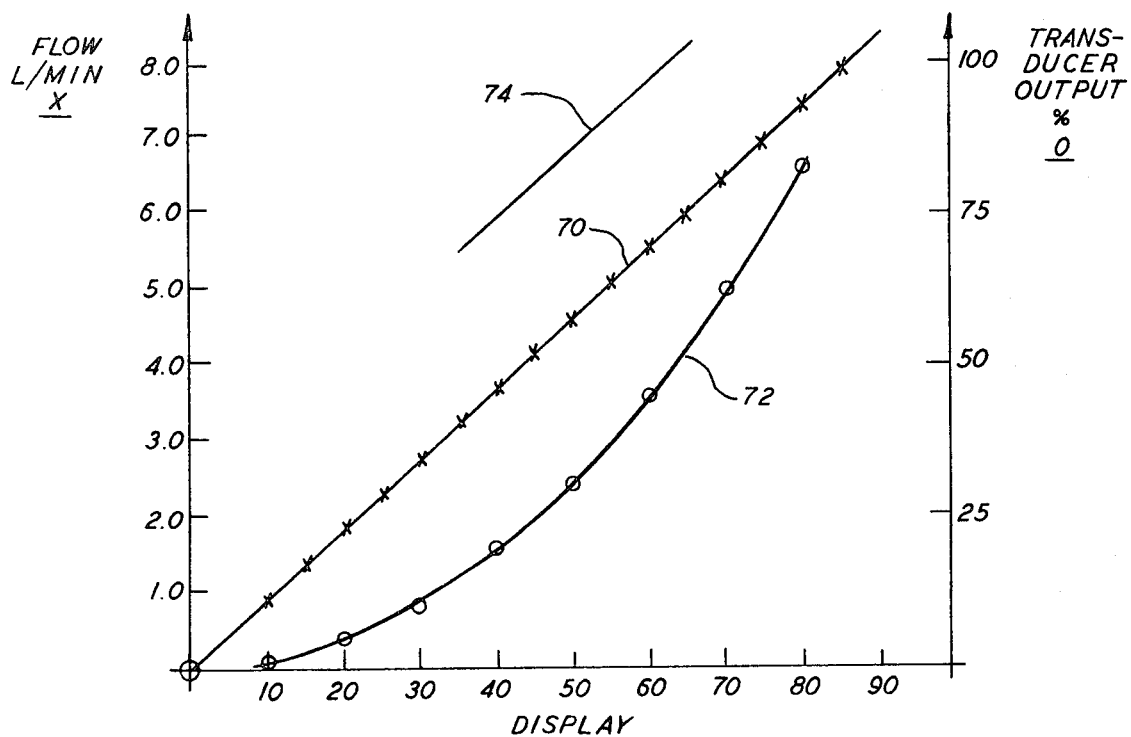
FIG. 5 graphically illustrates a representative square root linearization of an output signal from the pressure transducer in the fuel flow conduit which provides an arbitrary digital display substantially linear throughout the range of fuel flow.

Referring now to FIG. 5 the graph illustrates a representative flow calibration for fuel in liters per minute versus an arbitrary linear digital readout for a burner control fuel system utilizing the present invention. That trace is illustrated by the line designated 70 in FIG. 5. The second trace is a curve designated 72 which plots the linear digits along the abscissa against the voltage output of the differential pressure transducer 54 corrected for offset and scaled so that the maximum is 100%. Consequently, without the square root linearization giving the linear relation between flow rate and digits as illustrated by trace 70, it will be seen that sensitivity of the adjustment of the flow rate would be dependent on the particular flow existent at the time. That is, adjustment for low flow rates would be extremely fine whereas the adjustment for high flow rates would be extremely coarse. Uniformity of adjustment by operation of the needle valve is thus achieved irrespective of the extant flow rate and throughout the full range of flow rates. The oxidant calibration, not shown, exhibits similar characteristics.

The third trace 74 illustrates the flow calibration for the boost fuel in liters per minute verses the linear digital readout. It will be appreciated that trace 74 substantially parallels trace 70. As a consequence of this, resulting from the selection of the relative sizes of the restrictions 48 and 50 and tapping the boost fuel conduit with its restriction 56 between restrictions 48 and 50, the flames are normal and useable when switching between air-acetylene and nitrous oxide acetylene mixtures and thus only minor adjustment of the needle valves is necessary.

More particularly, the square root linearization operation provides for substantially equal sensitivity of adjustment for both the air acetylene and the nitrous oxide-acetylene fuel mixtures. The arrangement and relative sizing of the restrictions expands both the unboosted and boosted scales, shifts the scales toward one another, and enables use of substantially the full range of the scale, e.g. use of the full range of digits selected. Consequently, by combining the square root linearization operation on the transducer output signals with proper selection and arrangement of the restrictions in the flow conduit, substantially normal flame conditions with high and substantially similar sensitivity to adjustment are achieved when switching between the boosted and unboosted fuel flow. It will be appreciated that this is achieved notwithstanding higher flow obtains in the boosted state.

It will also be appreciated that, while the present preferred embodiment provides for manual adjustment of the flow, automated adjustment of the flow could readily be provided. For example, the manually adjusted needle valves 40 and 52 could each be replaced by a servomotor driven to a null signal based on a comparison in a second microprocessor of the linearized square root signal from the corresponding transducer and the desired flow command signal input to the second microprocessor, for example by a keyboard. Thus, the generated error signal commands the servomotor to open or close the valve until the commanded flow and measured flow correspond.

It will be apparent to those skilled in the art that various modifications and variations can be made in the present invention without departing from the scope or spirit of the invention.

What is claimed is:

1. A fluid measuring and control system for the burner in atomic spectroscopy comprising:
    a fluid flow conduit having an inlet port and an outlet port for transmitting fluid under pressure from said inlet port to said outlet port;
    a first restriction in said fluid flow conduit providing a pressure drop thereacross;
    a second restriction in said fluid flow conduit downstream of said first restriction;
    a boost conduit in communication with said fluid flow conduit at a location therealong between said first restriction and said second restriction and lying in communication with said outlet port, said boost conduit having a third restriction therein;
    a sensor for sensing the pressure drop across said first and said second restrictors and providing an output signal proportional to said pressure drop;
    means operable on said signal for providing a substantially linear indication of said pressure drop as a function of the rate of flow of the fluid through said conduit;
    means in said flow conduit downstream of said first and said second restrictions for adjusting the flow through said conduit to a predetermined flow in accordance with said indication; and
    means for enabling flow through said fluid flow conduit and said boost conduit simultaneously.

2. A system according to claim 1 wherein said fluid flow conduit is adapted to supply an oxidant to the burner, said sensor including a differential pressure transducer, said operable means including means performing a square root linearization on said signal.

3. A system according to claim 1 wherein said fluid flow conduit is adapted to supply fuel to the burner, said sensor including a differential pressure transducer, said operable means including means performing a square root linearization on said signal.

4. A system according to claim 1 wherein said fluid flow conduit and said boost conduit are adapted to supply fuel to the burner, a oxidant flow conduit having an inlet port and an outlet port for transmitting oxidant under pressure from said inlet port to said outlet port, a restriction in said oxidant conduit providing a pressure drop thereacross, a sensor for sensing the pressure drop across said restriction and providing an output signal proportional to said pressure drop, said operable means being operable on said signal for providing a substantially linear indication of said pressure drop as a function of the rate of flow of the oxidant through said oxidant conduit, means in said oxidant conduit downstream of said restriction for adjusting the flow through said oxidant conduit to a predetermined flow in accordance with said indication.

5. A system according to claim 4 wherein each of said sensors is a differential pressure transducer, said operable means including means performing a square root linearization on said signals.

* * * * *